US012703346B2

(12) United States Patent
Sans et al.

(10) Patent No.: US 12,703,346 B2
(45) Date of Patent: Aug. 11, 2026

(54) METHOD FOR OPTIMIZING THE ENERGY CONSUMPTION OF A MOTOR VEHICLE

(71) Applicant: Schaeffler Technologies AG & Co. KG, Herzogenaurach (DE)

(72) Inventors: Mariano Sans, Toulouse (FR); Julien Metayer, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/114,205

(22) PCT Filed: Nov. 20, 2023

(86) PCT No.: PCT/EP2023/082333
§ 371 (c)(1),
(2) Date: Mar. 21, 2025

(87) PCT Pub. No.: WO2024/110363
PCT Pub. Date: May 30, 2024

(65) Prior Publication Data

US 2026/0097752 A1 Apr. 9, 2026

(30) Foreign Application Priority Data

Nov. 25, 2022 (FR) ...................................... 2212313

(51) Int. Cl.
*B60W 20/13* (2016.01)
*B60K 6/40* (2007.10)
(Continued)

(52) U.S. Cl.
CPC ............... *B60W 20/13* (2016.01); *B60K 6/40* (2013.01); *B60L 50/75* (2019.02); *B60W 10/06* (2013.01);
(Continued)

(58) Field of Classification Search
CPC ...... B60W 20/13; B60W 20/11; B60W 20/12; B60W 10/06; B60W 10/08; B60W 10/26;
(Continued)

(56) References Cited

U.S. PATENT DOCUMENTS 9,193,351 B2 11/2015 Zhao et al.
11,167,744 B2 11/2021 Wang et al.
(Continued)

FOREIGN PATENT DOCUMENTS

CN 111959490 A 11/2020
FR 3068322 A1 1/2019
(Continued)

OTHER PUBLICATIONS

International Search Report and Written Opinion of the ISA for PCT/EP2023/082333 dated Dec. 20, 2023, 19 pages.
(Continued)

*Primary Examiner* — Ramsey Refai
(74) *Attorney, Agent, or Firm* — NIXON & VANDERHYE

(57) ABSTRACT

The invention concerns a method for optimization of the energy consumption of a motor vehicle (2) comprising a fuel or hydrogen tank, a battery and/or super-capacitors (30), a thermal engine (M) or a fuel cell (P), an electrical machine ($M_E$), a plurality of devices, each characterized by at least one variable of state, and a computer (4) configured to control the traction chain of the motor vehicle (2) over a predetermined distance, and being able to control the thermal engine (M) or the fuel cell (P), the electrical machine ($M_E$) and/or the devices by the emission of a series of set-points. The invention also concerns a computer (4) and a computer program product for implementation of such a method, as well as a motor vehicle (2) comprising such a computer (4).

10 Claims, 1 Drawing Sheet

(51) Int. Cl.

| | |
|---|---|
| ***B60L 50/75*** | (2019.01) |
| ***B60W 10/06*** | (2006.01) |
| ***B60W 10/08*** | (2006.01) |
| ***B60W 10/26*** | (2006.01) |
| ***B60W 10/30*** | (2006.01) |
| ***B60W 20/11*** | (2016.01) |
| ***B60W 20/12*** | (2016.01) |
| ***B60W 30/188*** | (2012.01) |
| ***B60W 40/04*** | (2006.01) |
| ***B60W 40/076*** | (2012.01) |

(52) U.S. Cl.

CPC ............ *B60W 10/08* (2013.01); *B60W 10/26* (2013.01); *B60W 10/30* (2013.01); *B60W 20/11* (2016.01); *B60W 20/12* (2016.01); *B60W 30/188* (2013.01); *B60W 40/04* (2013.01); *B60W 40/076* (2013.01); *B60W 2510/244* (2013.01); *B60W 2710/06* (2013.01); *B60W 2710/08* (2013.01); *B60W 2710/244* (2013.01); *B60W 2710/28* (2013.01); *B60Y 2200/91* (2013.01); *B60Y 2200/92* (2013.01); *B60Y 2400/102* (2013.01); *B60Y 2400/112* (2013.01); *B60Y 2400/114* (2013.01); *B60Y 2400/202* (2013.01)

(58) Field of Classification Search

CPC .... B60W 10/30; B60W 30/188; B60W 40/04; B60W 40/076; B60L 50/75; B60K 6/40

See application file for complete search history.

(56) References Cited

U.S. PATENT DOCUMENTS

| | | | | |
|---|---|---|---|---|
| 12,311,912 | B2 * | 5/2025 | Ritzmann | B60W 10/08 |
| 2016/0362096 | A1 * | 12/2016 | Nikovski | G01C 21/3469 |
| 2023/0347865 | A1 | 11/2023 | Ritzmann | |

FOREIGN PATENT DOCUMENTS

| | | | |
|---|---|---|---|
| FR | 3120594 | A1 | 9/2022 |
| WO | 2021229526 | A1 | 11/2021 |

OTHER PUBLICATIONS

M.A.S. Kamal-Kawabe, "Eco-driving using real-time optimization", Vitesco Technologies GmbH, IEEE, 2015 European Control Conference (ECC), Jul. 15-17, 2015, Linz, Austria, 6 pages.

Bernard J. et al., "Global Optimisation in the power management of a Fuel Cell Hybrid Vehicle (FCHV)", IEEE Vehicle Power and Propulsion (VPP) Conference, Sep. 6-8, 2006, Windsor, UK, 8 pages.

Emmanuel Trélat, "Contrôle optimal, théorie & applications", Université Pierre et Marie Curie (Paris 6) et Institut Universitaire de France, Laboratoire Jacques-Louis Lions, 263 pages.

A Sciarretta et al., "Optimal Ecodriving Control: Energy-Effcient Driving of Road Vehicles as an Optimal Control Problem", HAL Id: hal-01252197, Submitted on Jan. 7, 2016, 53 pages.

* cited by examiner

[Fig. 1]
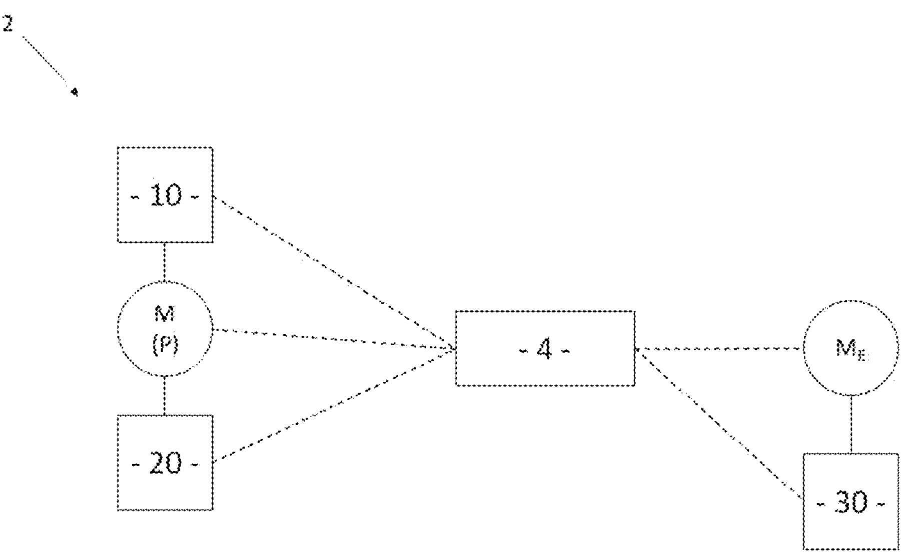
[Fig. 2]
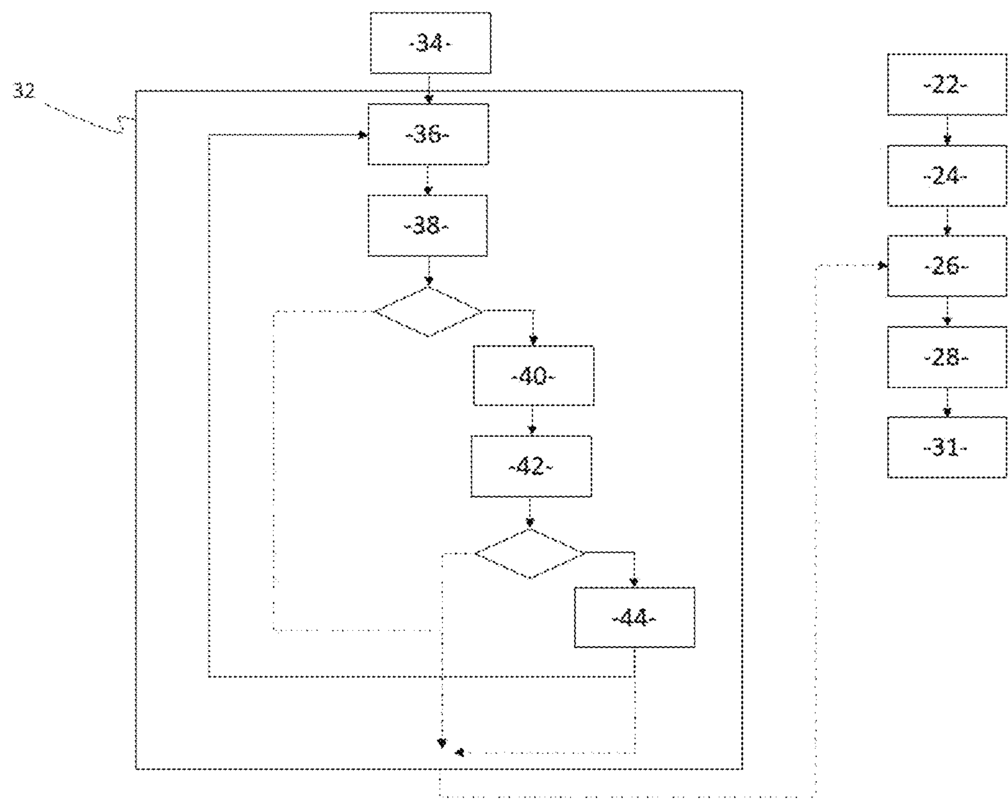

METHOD FOR OPTIMIZING THE ENERGY CONSUMPTION OF A MOTOR VEHICLE

This application is the U.S. national phase of International Application No. PCT/EP2023/082333 filed Nov. 20, 2023 which designated the U.S. and claims priority to FR 2212313 filed Nov. 25, 2022, the entire contents of each of which are hereby incorporated by reference.

The present invention concerns the optimization of the energy consumption of a motor vehicle, and more particularly a method for optimizing the energy consumption of a motor vehicle over a predefined distance. The objective of the invention is particular to generate optimized set-points to control the vehicle over said distance to be travelled while minimizing the energy consumption of the vehicle. "Energy consumption of the vehicle" according to the present invention means consumption of fuel, hydrogen, electrical energy, electric current supplied by the branches of an electronic charger of an electric battery of the vehicle, the number of restarting operations of a generating set in a series hybrid vehicle (also known as "range extender"), or also combined consumption of a plurality of these elements.

In a motor vehicle, it is known to optimize the energy consumption of the traction chain over a given or planned distance. Optimization of this type can be achieved on the fuel, on the electrical energy, on the hydrogen consumption (in the case of a vehicle provided with a fuel cell), or two or three of these criteria at once.

In a known manner, the optimization can be achieved by using the principle known by the name of Pontryagin Maximum Principle (PMP). This method consists of minimizing the Hamiltonian function on the basis of the criterion to be optimized, for example the quantity of fuel or hydrogen, or also the electrical energy consumed, and the description of the dynamics of the system. The dynamics of the system are defined on the basis of the state of different variables of the vehicle (speed of the vehicle, state of charge of the battery, and/or of the super-capacitors, temperatures, etc.) and of different inputs or set-points (torque set-points to be applied to the wheels of the vehicle for the thermal engine or for the electrical machine(s), torque set-points to be applied to the motor of the generating set, and/or power or current set-points for the fuel cell, and/or also heating set-points of the catalytic converter, and/or control set-points of the cooling circuit, etc.). The Hamiltonian function is minimized in order to determine the set-points making it possible to obtain the minimum consumption of fuel or hydrogen, and/or electrical energy Each input or set-point is dependent on the state of certain variables. For example, the torque set-point for the electrical machine to be applied to the wheels of the vehicle depends on the speed of the vehicle and the state of charge of the battery, the control set-point of the cooling circuit depends on the temperature in real time in the cooling circuit, and the heating set-point of the catalytic converter depends on the temperature in real time in the catalytic converter.

The Hamiltonian function thus determined is then minimized. In other words, the values of the set-points for which the Hamiltonian value is the lowest are selected and applied to the vehicle. The set-point values are thus determined in real time according to the current state of the vehicle.

The application of a PMP model of this type thus uses an internal model which describes the dynamics of the system to be controlled (in this case the motor vehicle and its traction chain), via differential equations (also known as "equations of state"), which provide a representation of the system. A PMP model of this type is consequently mainly based on an optimal control strategy by means of an open-loop, which calculates the optimal control solution according to the predictions of the internal model. Equations known as "conditions of optimality" using "associated states" (also known as "co-states", "associated parameters", "Lagrange parameters" or also "dual variables") are also used to solve the optimization problem. These associated states are associated with the equations of state, representing the conditions of the dynamic behavior of the physical system, and permit complete resolution of the optimization problem. In fact, the associated states must comply with equations of gradients, in order to guarantee the optimal nature of the global solution provided by the PMP model.

However, the problem of the initialization of these associated states is a crucial problem to be solved for the purpose of improving the precision of the final results obtained for the optimization, and to prevent the internal model from differing too much from the real physical system. The re-initialization (or re-calibration) of the associated states is in fact necessary at certain instants or periods of time, in particular when the traffic conditions change (as a result particularly of external disruptions, new obstacles detected on the road, change of itinerary, etc.). For this purpose, it is known to carry out the initialization of the associated states via a method known as "method of shots". A method of shots of this type is based on iterative simulations carried out on a common predicted scenario (in other words on a predictive horizon indicating in particular the curves and gradients of the road, compulsory traffic light stops, the density of the traffic, etc. in the case of a motor vehicle, when a predictive horizon of this type is available for the system). More specifically, target values for the final states of the variables of state or associated states are initially defined in an on-board computer within the vehicle (target values of this type must be reached at the end of the predicted common scenario). Simulations of the optimal control are then carried out on the basis of this predicted common scenario for different values of initialization of the associated states. Each simulation (or "shot") consists of a numerical simulation of the internal model, which begins with values of initialization of the associated states, and is applied throughout the predicted common scenario. Upon completion of each "shot", the final states calculated of the variables of state or of the assisted states are then compared with the target values predefined in the computer. Correction on the next values of initialization of the associated states is then calculated and applied to the equations of the model. The "shots" are repeated until the target values are reached with acceptable precision (determined by a predefined precision threshold), or until a maximum number of iterations has been carried out. The initialization values of the assisted states which lead to the "best" final states of the variables of state or of the assisted states are then provided as input of the PMP model, for continuation of the "real" optimal control of the energy consumption of the vehicle.

When direct mathematical resolutions are not available because of excessive complexity of the system concerned, the initialization of the associated states via a "method of shots" thus remains the main known method for controlling the parameters of the PMP model, with a very great influence (or level of sensitivity) on the final states of the system. This initialization therefore requires the greatest precision, even if the energy consumption of the vehicle is correctly minimized to the common scenario predicted. However, in the solutions according to the prior art, it often happens that this initialization of the associated states is relatively imprecise, and/or becomes erroneous in real conditions of traffic with variable or unexpected disturbances. This leads to imprecise and/or erroneous final values for the variables of state or the associated states, which may be very different from the target values. The optimality is therefore not achieved for the expected conditions of traffic.

There is therefore a need to be able to have an optimal control method which permits optimization of the energy consumption of a motor vehicle by implementation of a PMP model, providing more accurate and reliable initialization of the associated states, despite the potential differences between the internal model and the real physical system, and making it possible to maintain the optimality of the control, irrespective of the traffic conditions.

For this purpose and according to a first aspect, the invention concerns a method, implemented in a computer on board a motor vehicle, for optimization of the energy consumption of the vehicle, the vehicle comprising a tank for fuel or hydrogen, an electric battery and/or super-capacitors which can supply electrical energy, a thermal engine which is supplied by the fuel tank or a fuel cell supplied by the hydrogen tank, at least one electrical machine supplied with electrical energy provided by the battery and/or the super-capacitors, at least one device relating to the thermal engine or to the fuel cell, at least one device relating to the electrical machine, and at least one device relating to the electric battery or the super-capacitors, the itinerary of the vehicle over a predetermined distance as well as the traffic conditions being predefined or predicted within the computer, the computer being configured to control the traction chain of the motor vehicle over a predetermined distance, and being able to control the thermal engine or the fuel cell, the electrical machine and/or the devices by the emission of a series of set-points, the thermal engine or the fuel cell, the electrical machine, and the devices each being characterized by at least one variable of state, each variable of state making it possible to describe the operating state of the device which it characterizes, the assembly of the thermal engine or the fuel cell, the electrical machine and the devices being represented by a system of equations of state modelling the dynamics of the vehicle, said equations of state depending on at least instantaneous set-point values and variables of state, a series of associated states being associated with the equations of state and representing the conditions of the dynamic behavior of the vehicle, the energy consumption to be optimized being defined in an equation of criterion as being the sum of firstly the cumulative instantaneous consumption of fuel or of hydrogen of the thermal engine or of the fuel cell, and secondly a terminal corrective term representing electrical energy extracted from, or stored in, the electric battery or the super-capacitors, the terminal corrective term depending on the difference of state of charge between firstly the state of charge of the electric battery or the super-capacitors at the end of the predetermined distance, and secondly the state of charge of the electric battery or the super-capacitors at the start of the predetermined distance, said corrective term being a linear function defined by a proportionality factor, said method being implemented during a period divided into constant sampling instants, said method comprising, at each sampling instant, the steps of:

- calculation, for each set-point, of all the possible values of a Hamiltonian function of said set-point, using at least the equation of criterion; and
- determination of the value of each set-point for which said Hamiltonian function is the weakest,
- the computer being configured to define target values for the final states of the variables of state or of the associated states according conditions of traffic which are predefined or predicted within the computer, the common variables of state being selected by the computer as initial states, and the method also comprising a phase of updating of the equation of criterion, said phase comprising the steps of:
- selection of a first initial value for the associated states;
- calculation, according to said initial states and to the first initial value selected for the associated states, as well as to an internal model pre-implanted in the computer, of a first simulation of the internal model for said conditions of traffic predefined or predicted within the computer, a first pair of values formed by energy consumption of the vehicle, and a difference of state of charge of the electric battery or of the super-capacitors being obtained upon completion of the step of calculation of the first simulation;
- if, upon completion of the step of calculation of the first simulation, the target values for the final states of the variables of state or of the associated states are not obtained:
  - selection of a second initial value for the associated states, distinct from the first initial value;
  - calculation, according to said initial states and to the second initial value selected for the associated states, as well as to the internal model, of a second simulation of the internal model for said conditions of traffic predefined or predicted within the computer, a second pair of values formed by energy consumption of the vehicle, and a difference of state of charge of the electric battery or of the super-capacitors being obtained upon completion of the step of calculation of the second simulation;
- if, upon completion of the step of calculation of the second simulation, the target values for the final states of the variables of state or of the associated states are not obtained:
  - calculation according to the first and second pairs of values of energy consumption of the vehicle and to difference of state of charge of the electric battery or of the super-capacitors, of a first estimation of the proportionality factor, using a method of predefined estimation of gradient, the first estimation of the proportionality factor being used to update the equation of criterion of the energy consumption to be optimized; and
- loopback of the preceding steps, until the target values for the final states of the variables of state or of the associated states are obtained.

In the above-described method, the steps other than the phase of updating are looped back iteratively at each new sampling instant. In addition, the method is implemented for a predefined/given distance for the vehicle. A distance of this type is for example predicted by a system of the “electronic horizon information” (or eHorizon) type, which is conventionally based on the ADASIS (Advanced Driver-Assistance Systems Interface Specifications) data format standard for predictive driver-assistance systems, or on any other type of device), which is connected to the vehicle computer.

The method according to the invention makes it possible to define torque set-points in order to provide the power and the acceleration required by the driver when the vehicle is running over the given or planned distance, while minimizing the energy consumption of the vehicle. In addition, during the phase of updating, the method according to the invention makes it possible to adapt the estimation of the terminal corrective term, as well as to extract an estimation of the proportionality factor, in an integrated "observer" strategy. As a result, thanks to the phase of updating of the method, the initialization of the associated states is more accurate and reliable, despite the possible differences between the internal model and the real physical system, and makes it possible to maintain the optimality of the control irrespective of the traffic conditions.

According to a first variant embodiment, said updating phase is implemented at predetermined regular intervals of time.

According to another variant embodiment, the method also comprises a step of detection of at least one predetermined condition, said at least one predetermined condition concerning the itinerary of the vehicle and/or the traffic conditions predefined or predicted within the computer, and said updating phase is implemented only when said at least one predetermined condition has been detected by the computer. A predetermined condition of this type relates for example to external disturbances or to new obstacles detected on the road, etc.

Advantageously, the traffic conditions are predicted within the computer according to a predetermined temporal horizon, via a static and/or dynamic data management system relating to the road and/or to the road traffic infrastructure connected to the computer, with the computer being configured to receive said traffic conditions in accordance with sliding temporal windows throughout the itinerary of the vehicle over said predetermined distance. This makes it possible to maintain the optimality of the control when the traffic conditions are predicted according to a finite temporal horizon, as well as to calibrate the co-states.

Preferably, said method for estimation of a predefined gradient is a linear regression method, in particular a method of the recursive least squares. A recursive least squares method of this type makes it possible to filter the non-linearities in the pairs of values, i.e. energy consumption of the vehicle, and difference of state of charge of the electric battery or of the super-capacitors obtained upon completion of the different shots carried out during the updating phase.

Also preferably, when the method for estimation of a predefined gradient is a method of the recursive least squares, the final estimation of the proportionality factor calculated during the updating phase is stored in the computer. This makes it possible to reduce substantially the amount of data saved in the memory of the computer at each new iteration of the updating phase.

According to an embodiment of the invention, said predetermined distance which the vehicle must travel is segmented by the computer into N successive segments of distance, N being a predefined whole number, and, during the updating phase, the computer defines one or more target value(s) for the associated states on $N-1$ segments of distance, and defines one or more target value(s) for the final states of the variables of state on the remaining segment of distance.

According to a particular example of this embodiment, said $N-1$ segments of distance correspond to $N-1$ first segments of the predetermined distance which the vehicle must travel, said segment of distance continuing to correspond to the final segment of said predetermined distance.

Preferably, according to this embodiment, the computer imposes on the associated states, on said $N-1$ segments of distance, convergence towards a target value, the value of which corresponds to said proportionality factor.

According to an embodiment of the invention, at each sampling instant, the method also comprises the steps of:

determination of a field of set-points applicable comprising a series of values for each set-point;

calculation, for each set-point and in the field of applicable set-points determined, of all the possible gradients of state for said set-point, using at least the equations of state;

calculation, for each set-point, and in the field of applicable set-points determined, of all the possible values for the energy consumption to be optimized, using at least the equation of criterion.

The invention also concerns a computer for control of the traction chain of a motor vehicle over a predetermined distance, the vehicle comprising, as well as the computer, a fuel or hydrogen tank, an electric battery and/or super-capacitors which can supply electrical energy, a thermal engine which is supplied by the fuel tank or a fuel cell supplied by the hydrogen tank, at least one electrical machine supplied with electrical energy provided by the battery and/or the super-capacitors, at least one device relating to the thermal engine or to the fuel cell, at least one device relating to the electrical machine, and at least one device relating to the electric battery or the super-capacitors, the itinerary of the vehicle over a predetermined distance as well as the traffic conditions being predefined or predicted within the computer, the computer being able to control the thermal engine or the fuel cell, the electrical machine and/or the devices by the emission of a series of set-points, the thermal engine or the fuel cell, the electrical machine, and the devices each being characterized by at least one variable of state, each variable of state making it possible to describe the operating state of the device which it characterizes, the assembly of the thermal engine or the fuel cell, the electrical machine and the devices being represented by a system of equations of state modelling the dynamics of the vehicle, said equations of state depending on at least instantaneous set-point values and variables of state, a series of associated states being associated with the equations of state and representing the conditions of the dynamic behavior of the vehicle, the computer being configured to implement the steps of the method as previously described.

The invention also concerns a motor vehicle comprising a fuel or hydrogen tank, an electric battery and/or super-capacitors which can supply electrical energy, a thermal engine which is supplied by the fuel tank or a fuel cell supplied by the hydrogen tank, at least one electrical machine supplied with electrical energy provided by the battery and/or the super-capacitors, at least one device relating to the thermal engine or to the fuel cell, at least one device relating to the electrical machine, at least one device relating to the electric battery or to the super-capacitors, and a computer for control of the traction chain of the motor vehicle over a predetermined distance, the itinerary of the vehicle over a predetermined distance as well as the traffic conditions being predefined or predicted within the computer, the computer being able to control the thermal engine or the fuel cell, the electrical machine and/or the devices by the emission of a series of set-points, the thermal engine or the fuel cell, the electrical machine, and the devices each being characterized by at least one variable of state, each variable of state making it possible to describe the operating state of the device which it characterizes, the assembly of the thermal engine or the fuel cell, the electrical machine and the devices being represented by a system of equations of state modelling the dynamics of the vehicle, said equations of state depending on at least instantaneous set-point values and variables of state, wherein the computer is as previously described.

The invention also concerns a computer program product, distinguished in that it comprises a series of program code instructions which, when they are executed by one or more processors, configure the processor(s) in order to implement the method as previously described.

A description will be provided hereinafter, by way of non-limiting examples, of embodiments of the invention, with reference to the appended figures in which:

FIG. 1 illustrates schematically a vehicle according to the invention, the vehicle being provided with an on-board computer; and FIG. 2 is a flowchart representing a method for optimization of the energy consumption of the vehicle, implemented by the computer of FIG. 1, according to the present invention.

With reference to FIG. 2, the present invention concerns a method, implemented in a computer 4 on board a motor vehicle 2 (shown in FIG. 1) for optimization of the energy consumption of the motor vehicle 2. The motor vehicle 2 is for example (but not limited to) a hybrid vehicle. In addition to the computer 4, a hybrid vehicle 2 of this type also conventionally comprises a thermal engine M (in the case of a hybrid vehicle 2 of the "thermal-electric" type), often known as an ICE (Internal Combustion Engine), or a fuel cell P which operates on hydrogen (in the case of a hybrid vehicle 2 of the "hydrogen-electric" type). A hybrid vehicle 2 of this type also comprises at least one electrical machine $M_E$, often known as an EMA, a fuel tank or hydrogen tank (not represented in FIG. 1) and an electrical supply battery 30 (or super-capacitors in a variant not represented).

The motor vehicle 2 also comprises at least one device relating to the thermal engine M, and in particular a device 10 for cooling of the thermal engine M and a catalytic converter 20, or at least one device relating to the fuel cell P (a device of this type not being represented in FIG. 1). The cooling device 10 makes it possible to reduce the temperature of the thermal engine M during its use. In particular, the cooling device 10 comprises a cooling liquid. The catalytic converter 20, which is connected to the thermal engine M by the exhaust system, can reduce the quantity of pollutant products in the exhaust gases emitted by the thermal engine M before they are discharged to the exterior of the vehicle. The catalytic converter 20 also comprises a heating device, which can increase the temperature in the catalytic converter 20, in order to implement the decontamination of the exhaust gases. The heating device of the catalytic converter 20 must be supplied with electrical energy in order to operate. The motor vehicle 2 also comprises at least one device relating to the electrical machine $M_E$, in particular a series of voltage converters (not represented in FIG. 1) which make it possible to convert the voltage between the battery 30 and the electrical machine $M_E$. The motor vehicle 2 also comprises at least one device relating to the electric battery 30 (or to the super-capacitors), a device of this type not being represented in FIG. 1 for reasons of clarity.

The thermal engine M is in particular suitable for being supplied with the fuel provided by the fuel tank, and the fuel cell P can be supplied by the hydrogen tank. The thermal engine M also comprises an exhaust system for the exhaust gases emitted during the combustion of the mixture of air and fuel in the thermal engine M. The electrical machine $M_E$ can be supplied by the electrical energy provided by the battery 30.

The vehicle 2 can comprise other devices relating to the thermal engine M or to the fuel cell P, and other devices relating to the electrical machine $M_E$.

"System" means the series of elements fitted in the vehicle 2, which can consume or produce electrical energy, fuel or hydrogen. For example, the system comprises the series of the devices previously described, i.e. the thermal engine M or the fuel cell P, the electrical machine $M_E$, the cooling device 10, the catalytic converter 20 and the battery 30.

Each device is characterized by at least one variable of state, making it possible to describe the operating state of the device. For example, the cooling device 10 is characterized by a cooling liquid temperature. Also for example, the catalytic converter 20 is characterized by an internal temperature value. Again for example, the battery 30 is characterized by a variable of state of load, the thermal engine M is characterized by a speed of rotation, the fuel cell P is characterized by a temperature or pressures which exist in the circuits for supply of hydrogen and oxygen, etc.

The energy consumption to be optimized of the vehicle 2, to be optimized via the method according to the present invention, is represented by an equation of criterion g(u, q). The equation of criterion g(u, q) depends on at least instantaneous set-point values u and variables of state q. Also preferably, the equation of criterion also depends on disturbances and/or set-points w applied to the vehicle 2, and is then written as g(u,q,w). The energy consumption J to be optimized over a given period of time T is associated with the equation of criterion via the following equation:

$$J = \int_0^T g(u, q, w) \cdot dt$$

In addition, the energy consumption J to be optimized is defined as being the sum of firstly the cumulative instantaneous consumption Ji of fuel or hydrogen of the thermal engine M or of the fuel cell P, and secondly a terminal corrective term Jc representing electrical energy extracted from, or stored in, the battery 30 (or the super-capacitors). The terminal term corrective Jc can be calculated from the difference of the state of charge between firstly the state of charge $SoC_{final}$ of the electric battery 30 (or of the super-capacitors) at the end of the distance travelled by the vehicle 2, and secondly the state of charge $SoC_{initial}$ of the electric battery 30 (or of the super-capacitors) at the start of the distance travelled by the vehicle 2. Thus, the terminal corrective term Jc is then expressed as:

$$J_c = k \cdot (SoC_{final} - SoC_{initial})$$

where k is a factor of positive proportionality, and the value of Jc is positive if the difference ($SoC_{final}$–$SoC_{initial}$) is positive (in which case the electrical energy stored in the battery 30 or in the super-capacitors, and the corrective term Jc is subtracted from the cumulative instantaneous consumption Ji in the expression of J), the value of Jc being negative if the difference ($SoC_{final}$–$SoC_{initial}$) is negative (in which case the electrical energy is extracted from the battery 30 or from the super-capacitors, and the corrective term Jc is added to the cumulative instantaneous consumption Ji in the expression of J).

The energy consumption J to be optimized is then expressed in the equation of criterion as:

$$J = J_i - k \cdot (SoC_{final} - SoC_{initial})$$

The system is represented by a system of equations of state f(u, q) which model the dynamics of the vehicle 2. The equations of state f(u, q) depend on at least instantaneous set-point values u and variables of state q. Also preferably, the equations of state additionally depend on disturbances and/or set-points w applied to the vehicle 2, and are then written as f(u, q, w).

The computer 4 forms for example part of a data processing unit storing an application or computer program which can cooperate with the computer 4 (the data processing unit and the application or the computer program not being represented in FIG. 1 for reasons of clarity). As a variant, the application or the computer program is stored directly in the computer 4. The computer 4 is connected to the thermal engine or to the fuel cell P to the electrical machine $M_E$, to the electric battery 30, as well as to the series of devices previously described comprising in particular the cooling device 10 and the catalytic converter 20. The computer 4 is also connected to a static and/or dynamic data management system relating to the road and/or to the road traffic infrastructure (a system of this type not being represented in FIG. 1). The static and/or dynamic data management system is for example configured according to a cloud architecture, and makes it possible to provide (or predict) a temporal horizon concerning the operating cycle (or period of change of state) of road infrastructure elements detected in front of the vehicle on its journey, depending in particular on the speed of the vehicle and the density of traffic on the road. The management system also makes it possible to predict the distances, the curves and the gradients of the road, compulsory traffic light stops, the density of the traffic, etc. The management system is for example a system of the "electronic horizon information" (or eHorizon) type, which is conventionally based on the ADASIS (Advanced Driver-Assistance Systems Interface Specifications) data format standard for predictive driver-assistance systems, or on any other type of device). In a known manner, a system of this type of the "eHorizon" type makes it possible to control both static data relating to the road infrastructure (such as, for example, the nature of the roads, crossroads, the statutory limit speeds applied, etc.), and to dynamic data (mean speed of the vehicles located on the road, density of the traffic, dynamic data relating to the road infrastructure elements etc.), with the static and dynamic data as a whole representing the traffic conditions. Such a system of the "eHorizon" type can receive these data, decode them (via a decoder), reconstitute them (via a data reconstructor), and transmit them to the computer 4, and can implement algorithms of prediction of distance of the vehicles, using for example the concept of "most probable distance or path" (Most Probable Path). The computer 4 is configured to receive the traffic conditions predicted by the management system, according to sliding temporal windows along the entire itinerary of the vehicle 2, over the distance travelled by the vehicle 2.

The computer 4 can receive a measurement of each value of variable of state relating to each device. In addition, the computer 4 can control each device to which it is connected, by the emission of a set-point, according to the value(s) of variables relating to this device.

Thus, for example, the set-point emitted to the thermal engine M designates the value of the torque to be applied to the thermal engine M, and depends in particular on the speed of the vehicle and the requirement for power from the driver of the vehicle. Also for example, the set-point emitted to the fuel cell P designates the power which the fuel cell P is required to supply, and depends on the state of charge of the battery 30 and/or of the super-capacitors, as well as on the requirement for power from the driver. Also for example, the set-point emitted to the electrical machine $M_E$ designates the torque to be applied to the electrical machine $M_E$, and depends on the state of charge of the battery 30 and on the requirement for power from the driver.

The set-point emitted to the catalytic converter 20 concerns the temperature in the catalytic converter 20, and depends on the temperature measured in the catalytic converter 20. The set-point emitted to the cooling device 10 concerns the temperature of the cooling liquid, and depends on the temperature measured of the cooling liquid.

The computer 4 is also configured to determine the field of set-points applicable, comprising a series of values for each set-point. The computer 4 is also configured to implement the principle of the PMP method, in other words the Pontryagin Maximum Principle, by determining the Hamiltonian function H(x, u*, λ) on the basis of the different values of set-point of the field of set-points applicable. At this point, the notation u* is introduced, which represents the optimum control. There is also introduction of the associated states λ (also known as "associated parameters", "Lagrange parameters", "associated vectors", or also "co-state vectors"). These associated states are associated with the equations of state, representing the conditions of the dynamic behaviour of the physical system, and will make it possible to resolve the optimization problem completely. The computer 4 is also configured to define target values for the final states of the variables of state q or of the associated states λ, according to the traffic conditions predefined or predicted within the computer 4.

The computer 4 comprises a processor which can implement a series of instructions making it possible to carry out these functions.

With reference to FIG. 2, an embodiment will now be described of the method for optimization of the energy consumption of the vehicle 2 according to the invention, implemented by a computer 4 as previously described.

In order to simplify the description, the variable taken into consideration is the state of charge of the battery 30 or of the super-capacitors. The different control set-points taken into consideration are for example: the torque of the thermal engine M and the torque of the electrical machine $M_E$. Other parameters could be taken into consideration, concerning the at least one device relating to the electrical machine $M_E$ or parameters concerning the fuel cell P, or the at least one device relating to the fuel cell P, or also parameters concerning the at least one device relating to the battery 30 or to the super-capacitors.

The method is implemented during a period which is divided into constant sampling instants, and comprises steps which are looped back iteratively at each new sampling instant. The period of sampling between two consecutive sampling instants depends on the dynamics of the system, and can be selected as being for example between 10 ms and 500 ms, typically equal to 100 ms.

According to a particular embodiment illustrated in FIG. 2, the method comprises an initial step 22 during which the computer 4 determines a field of set points applicable u comprising a series of values for each set-point u to be applied to the variables.

The method then comprises a following step 24, during which the computer 4 calculates, for each set-point and in the field of applicable set points $\underline{u}$ determined, all the gradients of state possible for said set-point, using at least the equations of state f(u, q, w) describing the system.

The method comprises a parallel or following step 26, during which the computer 4 calculates, for each set-point and in the field of applicable set-points $\underline{u}$ determined, all the possible values for the criterion or the combination of criteria to be optimized, using at least the equation of criterion g(u, q, w). As a variant, not represented, the steps of calculation 24, 26 can be inverted.

The method then comprises a following step 28, during which the computer 4 calculates, for each set-point and in the field of applicable set-points $\underline{u}$ determined, all the possible values $\underline{H}$ of a Hamiltonian function H(u, q, λ, w) of said set-point, using the values of gradients of state and the possible values for the energy consumption to be optimized, determined for this set-point. For this purpose, the computer 4 uses the principle of the PMP method, in other words the method of the Pontryagin Maximum Principle.

The Hamiltonian function H(u, q, λ, w) is then expressed as:

$$\underline{H}(\underline{u}, q, \lambda, w) = [g(\underline{u}, q, W)] + \lambda^T[f(\underline{u}, q, w)]$$

where $\lambda^T$ is the transpose of the associated vector λ.

Then, during a following step 31, the computer 4 determines the series of so-called "optimal" set-points u*, by minimizing for each of the set-points the Hamiltonian function calculated during the preceding step 28. In the embodiment taken into consideration, the computer 4 thus determines a first optimal "thermal" set-point, which is intended to control the thermal engine M, and a second optimal "electrical" set-point which is intended to control the electrical machine $M_E$.

According to the invention, a phase 32 of updating of the equation of criterion, carried out by the computer 4, can also be implemented during the method. According to a first variant embodiment (not illustrated in FIG. 2), the updating phase 32 is implemented at predetermined regular intervals of time, spaced from one another for example by several minutes. According to another variant embodiment, illustrated in FIG. 2, the method comprises a step 34, during which the computer 4 detects at least one predetermined condition. The predetermined condition(s) typically concern (s) the itinerary of the vehicle 2, and/or the conditions of traffic predefined or predicted within the computer 4. Predetermined conditions of this type relate for example to external disturbances, to a change of itinerary, or to new obstacles detected on the road, etc. The phase of updating 32 is thus implemented only when the pre-determined condition (s) has/have been detected by the computer 4.

Initially, during the phase of updating 32, the common variables of state q are selected by the computer 4 as initial states. In addition, the computer 4 defines target values for the final states of the variables of state q or of the associated states λ, according to the traffic conditions predefined or predicted within the computer 4. The updating phase 32 corresponds to the "method of shots", and comprises a first step 36 during which the computer 4 selects a first initial value for the associated states λ.

The updating phase 32 comprises a following step 38, during which the computer 4 calculates, according to the initial states and the first initial value selected for the associated states λ, as well as to an internal model pre-implanted in the computer 4, a first simulation of the internal model for the traffic conditions predefined or predicted within the computer 4. A first pair of values, i.e. energy consumption J1 of the vehicle 2, and difference of state of charge $\Delta SoC_1$ of the electric battery 30 (or the super-capacitors) is thus obtained upon completion of this calculation step 38; where $\Delta SoC_1=(SoC_{final1}-SoC_{initial})$.

If, upon completion of the step 38 of calculation of the first simulation, the target values for the final states of the variable of state q or of the associated states λ have been obtained, the updating phase 32 ends. Otherwise, the updating phase 32 comprises a following step 40, during which the computer 4 selects a second initial value for the associated states λ, distinct from the first initial value. According to a first advantageous embodiment, the second initial value is selected by varying a step which depends on the difference between the first initial value and the target value for the associated states λ, and by regulating the value of the step carefully. According to another advantageous embodiment, the second initial value is selected by inverting a model of network of neurons (which presupposes in this case a phase before training and learning of the network of neurons).

The phase of updating 32 comprises a following step 42, during which the computer 4 calculates, according to the initial states and the second initial value selected for the associated states λ, as well as to the internal model, a second simulation of the internal model for the traffic conditions predefined or predicted within the computer 4. A second pair of values, i.e. energy consumption J2 of the vehicle 2, and difference of state of charge $\Delta SoC_2$ of the electric battery 30 (or of the super-capacitors) is thus obtained upon completion of this calculation step 42; where $\Delta SoC_2=(SoC_{final2}-SoC_{initial})$.

If, upon completion of the step 42 of calculation of the second simulation, the target values for the final states of the variables of state q or of the associated states λ are obtained, the updating phase 32 ends. Otherwise, the updating phase 32 comprises a following step 44, during which the computer 4 calculates, according to the first and second pairs of values, i.e. energy consumption J1, J2 of the vehicle 2 and difference of state of charge $\Delta SoC_1$, $\Delta SoC_2$ of the electric battery 30 (or of the super-capacitors), a first estimation of the proportionality factor k. In fact, each simulation of the internal model carried out provides a pair of values, i.e. energy consumption of the vehicle 2, and difference of state of charge of the electric battery 30 (or of the super capacitors); and the relationship between these two variables is a refined function. The slope of this refined function is the proportionality factor k, with the original y-axis being the value of the energy consumption of the vehicle 2 when the final state of charge of the electric battery 30 is equal to the initial state of charge thereof.

This first estimation of the proportionality factor k (provided by using an integrated "observer" strategy) is then used to update the equation of criterion (previously described) of the energy consumption J to be optimized, with the equation of criterion thus updated being re-used in the step of calculation 26. The steps 36, 38, 40, 42, 44 of the updating phase 32 are then looped back using the updated equation of criterion, until the target values for the final states of the variables of state q or of the associated states λ are obtained. The updating phase 32 then ends.

The step 44 of calculation of an estimation of the proportionality factor k is carried out by the computer 4 using a method of estimation of predefined gradient. Preferably, the method of estimation of gradient can be a linear regression method, formulated in the form of recursive least squares. In this case, the final estimation of the proportionality factor k calculated during the step of calculation 44 is saved in the computer 4. In addition, a method of this type of the recursive least squares requires initialization of the parameters after the second shot carried out during the step 42 of calculation of the second simulation. As a variant, the method of predefined estimation of gradient can be a method of the mean values, a method of the generalized least squares, or any other known method for estimation of gradient.

The method can be reiterated during the use of the vehicle.

According to an embodiment of the invention, the distance which the vehicle 2 must travel is segmented by the computer 4 into N successive segments of distances, with N being a predefined whole number. During the updating phase 32, the computer 4 can thus define one or more target value(s) for the associated states λ over N−1 segments of distance, and one or more target value(s) for the final states of the variables of state q over the remaining segment of distance. This remaining segment of distance corresponds for example to the final segment of distance which the vehicle 2 must cover, with the N−1 segments of distance thus corresponding to the N−1 first segments of the distance. In this case, the final state of the state of charge of the battery 30 over the remaining segment of distance is for example imposed. As a variant, the remaining segment of distance can correspond to any other segment of the distance which the vehicle 2 must travel. In this case, the final state of the state of charge of the battery 30 on this segment of distance is for example imposed, typically when the vehicle 2 reaches the entry to an urban area, or arrives at an electrical recharging terminal during the distance. As a variant, a final temperature in the passenger space of the vehicle 2 or in the catalytic converter can be imposed after a given minimal period for a temperature increase during the heating phase.

Preferably, according to this embodiment, the computer 4 imposes on the associated states λ, on the N−1 segments of distance for which the final states of the variables of state q are left free, convergence towards a target value, the value of which corresponds to the proportionality factor k. In fact, in order to obtain the minimal value for the energy consumption J to be optimized at the end of a predicted scenario, without any constraint imposed on the final states of the variables of state q, the PMP method means that the associated states λ converge at the end of this scenario towards a target value, the value of which corresponds to the proportionality factor k (the demonstration of this theorem being known in the prior art).

The method thus makes it possible to obtain set-point values for which the energy consumption of the vehicle 2 is minimal.

In addition, during the phase of updating, the method according to the invention makes it possible to adapt the estimation of the terminal corrective term, as well as to extract an estimation of the proportionality factor, in an integrated "observer" strategy. As a result, thanks to the phase 32 of updating of the method, the initialization of the associated states λ is more accurate and reliable, despite the possible differences between the internal model and the real physical system, and this makes it possible to maintain the optimality of the control irrespective of the traffic conditions.

The invention claimed is:

1. A method, implemented in a computer (4) on board a motor vehicle (2), for optimization of the energy consumption of the vehicle (2), the vehicle (2) comprising a tank for fuel or hydrogen, an electric battery and/or super-capacitors (30) which can supply electrical energy, a thermal engine (M) which is supplied by the fuel tank or a fuel cell (P) supplied by the hydrogen tank, at least one electrical machine ($M_E$) supplied with electrical energy provided by the battery and/or the super-capacitors (30), at least one device (10, 20) relating to the thermal engine (M) or to the fuel cell (P), at least one device (30) relating to the electrical machine ($M_E$), and at least one device relating to the electric battery or the super capacitors (30), the itinerary of the vehicle (2) over a predetermined distance as well as the traffic conditions being predefined or predicted within the computer (4), the computer (4) being configured to control the traction chain of the motor vehicle (2) over a predetermined distance, said predetermined distance which the vehicle (2) must travel being segmented by the computer (4) into N successive segments of distances, N being a predefined whole number, said N−1 segments of distance corresponding to the N−1 first segments of the predetermined distance which the vehicle (2) must travel, said remaining segment of distance corresponding to the final segment of said predetermined distance, the computer (4) being able to control the thermal engine (M) or the fuel cell (P), the electrical machine ($M_E$) and/or the devices (10, 20, 30) by the emission of a series of set-points, the thermal engine (M) or the fuel cell (P), the electrical machine ($M_E$) and the devices (10, 20, 30) each being characterized by at least one variable of state, each variable of state making it possible to describe the operating state of the device which it characterizes, the assembly of the thermal engine (M) or the fuel cell (P), the electrical machine ($M_E$) and the devices (10, 20, 30) being represented by a system of equations of state modelling the dynamics of the vehicle (2), said equations of state depending on at least instantaneous set-point values and variables of state, a series of associated states being associated with the equations of state and representing the conditions of the dynamic behavior of the vehicle (2), the energy consumption to be optimized being defined in an equation of criterion as being the sum of firstly the cumulative instantaneous consumption of fuel or of hydrogen of the thermal engine (M) or of the fuel cell (P), and secondly a corrective terminal term representing electrical energy extracted from, or stored in, the electric battery or the super-capacitors (30), the corrective terminal term depending on the difference of state of charge between firstly the state of charge of the electric battery or the super-capacitors (30) at the end of the predetermined distance, and secondly the state of charge of the electric battery or the super-capacitors (30) at the start of the predetermined distance, said corrective term being a linear function defined by a factor of proportionality, said method being implemented during a period divided into constant sampling instants, the method comprising, at each sampling instant, the steps of:

calculation (28), for each set-point, of all the possible values of a Hamiltonian function of said set-point, using at least the equation of criterion; and determination (31) of the value of each set-point for which said Hamiltonian function is the weakest, characterized in that the computer (4) is configured to define one or more target value(s) for the associated states on N−1 segments of distance, and to define one or more target value(s) for the final states of the variables of state on the remaining segment of distance, according to conditions of traffic which are predefined or predicted within the computer (4), the common variables of state being selected by the computer (4) as initial states, and in that the method also comprises a phase (32) of updating of the equation of criterion, said phase (32) comprising the steps of:

selection (36) of a first initial value for the associated states;

calculation (38), according to said initial states and to the first initial value selected for the associated states, as well as to an internal model pre-implanted in the computer (4), of a first simulation of the internal model for said conditions of traffic predefined or predicted within the computer (4), a first pair of values formed by energy consumption of the vehicle (2), and a difference of state of charge of the electric battery or of the super-capacitors (30) being obtained upon completion of the step (38) of calculation of the first simulation;

if, upon completion of the step (38) of calculation of the first simulation, the target values for the final states of the variables of state or of the associated states are not obtained:

selection (40) of a second initial value for the associated states, distinct from the first initial value;

calculation (42), according to said initial states and to the second initial value selected for the associated states, as well as to the internal model, of a second simulation of the internal model for said conditions of traffic predefined or predicted within the computer (4), a second pair of values formed by energy consumption of the vehicle (2), and a difference of state of charge of the electric battery or of the super-capacitors (30) being obtained upon completion of the step (42) of calculation of the second simulation;

if, upon completion of the step (42) of calculation of the second simulation, the target values for the final states of the variables of state or of the associated states are not obtained:

calculation (44), according to the first and second pairs of values of energy consumption of the vehicle (2) and to difference of state of charge of the electric battery or of the super-capacitors (30), of a first estimation of the proportionality factor, using a method of predefined estimation of gradient, the first estimation of the proportionality factor being used to update the equation of criterion of the energy consumption to be optimized; and loopback of the preceding steps (36, 38, 40, 42, 44), until the target values for the final states of the variables of state or of the associated states are obtained, the computer (4) being configured to impose on the associated states, on said N−1 segments of distance, convergence towards a target value, the value of which corresponds to said proportionality factor.

2. The method as claimed in claim 1, wherein said phase of updating (32) is implemented at predetermined regular intervals of time.

3. The method as claimed in claim 1, wherein the method additionally comprises a step (34) of detection of at least one predetermined condition, said at least one predetermined condition concerning the itinerary of the vehicle and/or the traffic conditions predefined or predicted within the computer (4), and wherein said updating phase (32) is implemented only when said at least one predetermined condition has been detected by the computer (4).

4. The method as claimed in claim 1, wherein the traffic conditions are predicted within the computer (4) according to a predetermined temporal horizon, via a static and/or dynamic data management system relating to the road and/or to the road traffic infrastructure connected to the computer (4), with the computer (4) being configured to receive said traffic conditions in accordance with sliding temporal windows throughout the itinerary of the vehicle (2) over said predetermined distance.

5. The method as claimed in claim 1, wherein said method for estimation of a predefined gradient is a method of the recursive least squares.

6. The method as claimed in claim 5, wherein the final estimation of the proportionality factor calculated during the updating phase (32) is stored in the computer (4).

7. The method as claimed in claim 1, wherein at each sampling incident, the method also comprises the steps of:

determination (22) of a field of set-points applicable comprising a series of values for each set-point;

calculation (24), for each set-point and in the field of applicable set-points determined, of all the possible gradients of state for said set-point, using at least the equations of state;

calculation (26), for each set-point, and in the field of applicable set-points determined, of all the possible values for the energy consumption to be optimized, using at least the equation of criterion.

8. A computer (4) for control of the traction chain of a motor vehicle (2) over a predetermined distance, the vehicle (2) comprising, as well as the computer (4), a fuel or hydrogen tank, an electric battery and/or super-capacitors (30) which can supply electrical energy, a thermal engine (M) which is supplied by the fuel tank or a fuel cell (P) supplied by the hydrogen tank, at least one electrical machine ($M_E$) supplied with electrical energy provided by the battery and/or the super-capacitors (30), at least one device (10, 20) relating to the thermal engine (M) or to the fuel cell (P), at least one device (30) relative to the electrical machine ($M_E$), and at least one device relating to the electric battery or the super-capacitors (30), the itinerary of the vehicle (2) over a predetermined distance as well as the traffic conditions being predefined or predicted within the computer (4), the computer (4) being able to control the thermal engine (M) or the fuel cell (P), the electrical machine ($M_E$) and/or the devices (10, 20, 30) by the emission of a series of set-points, the thermal engine (M) or the fuel cell (P), the electrical machine ($M_E$), and the devices (10, 20, 30) each being characterized by at least one variable of state, each variable of state making it possible to describe the operating state of the device which it characterizes, the assembly of the thermal engine (M) or the fuel cell (P), the electrical machine ($M_E$) and the devices (10, 20, 30) being represented by a system of equations of state modelling the dynamics of the vehicle (2), said equations of state depending on at least instantaneous set-point values and variables of state, a series of associated states being associated with the equations of state and representing the conditions of the dynamic behavior of the vehicle (2), the computer (4) being characterized in that it is configured to implement the steps of the method as claimed in claim 1.

9. A motor vehicle (2) comprising a fuel or hydrogen tank, an electric battery and/or super-capacitors (30) which can supply electrical energy, a thermal engine (M) which is supplied by the fuel tank or a fuel cell (P) supplied by the hydrogen tank, at least one electrical machine ($M_E$) supplied with electrical energy provided by the battery and/or the super-capacitors (30), at least one device (10, 20) relating to the thermal engine (M) or to the fuel cell (P), at least one device (30) relating to the electrical machine ($M_E$), at least one device relating to the electric battery or to the super-capacitors (30), and a computer (4) for control of the traction chain of the motor vehicle (2) over a predetermined distance, the itinerary of the vehicle (2) over a predetermined distance as well as the traffic conditions being predefined or predicted within the computer (4), the computer (4) being able to control the thermal engine (M) or the fuel cell (P), the electrical machine ($M_E$) and/or the devices (10, 20, 30) by the emission of a series of set-points, the thermal engine (M) or the fuel cell (P), the electrical machine ($M_E$), and the devices (10, 20, 30) each being characterized by at least one variable of state, each variable of state making it possible to describe the operating state of the device which it characterizes, the assembly of the thermal engine (M) or the fuel cell (P), the electrical machine ($M_E$) and the devices (10, 20, 30) being represented by a system of equations of state modelling the dynamics of the vehicle (2), said equations of state depending on at least instantaneous set-point values and variables of state, the motor vehicle (2) being characterized in that the computer (4) for control of the traction chain is in conformity with claim 8.

10. A computer program product, characterized in that it comprises a series of program code instructions which, when they are executed by one or more processors, configure the processor(s) in order to implement the method as claimed in claim 1.

* * * * *